Feb. 6, 1962          L. D. SOUBIER          3,019,480
METHOD OF AND APPARATUS FOR MAKING PLASTIC ARTICLES
Filed March 17, 1959          9 Sheets-Sheet 6

INVENTOR
Leonard D. Soubier
BY
Mead, Browne, Schuyler & Beveridge
ATTORNEYS

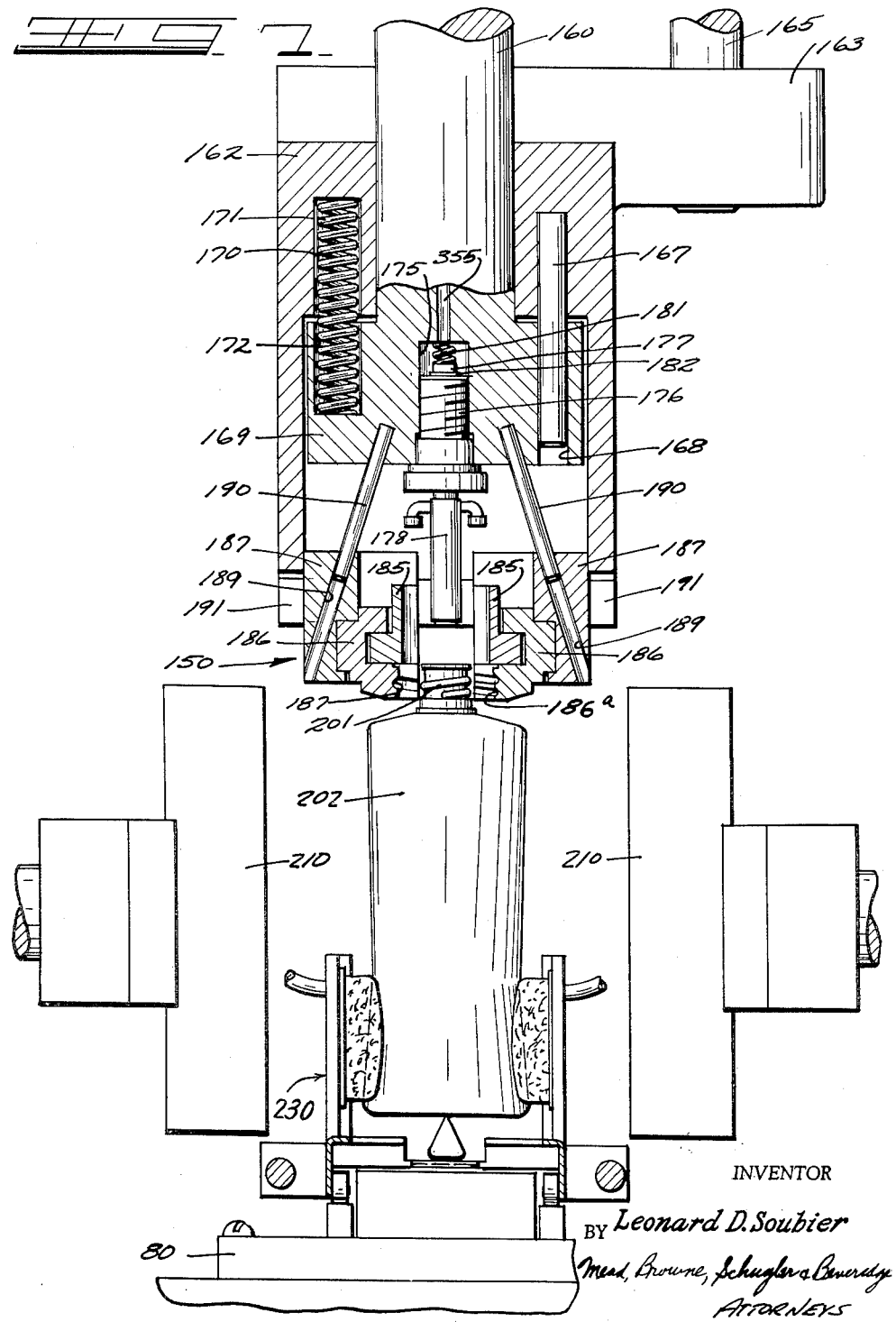

Feb. 6, 1962 L. D. SOUBIER 3,019,480
METHOD OF AND APPARATUS FOR MAKING PLASTIC ARTICLES
Filed March 17, 1959 9 Sheets-Sheet 8
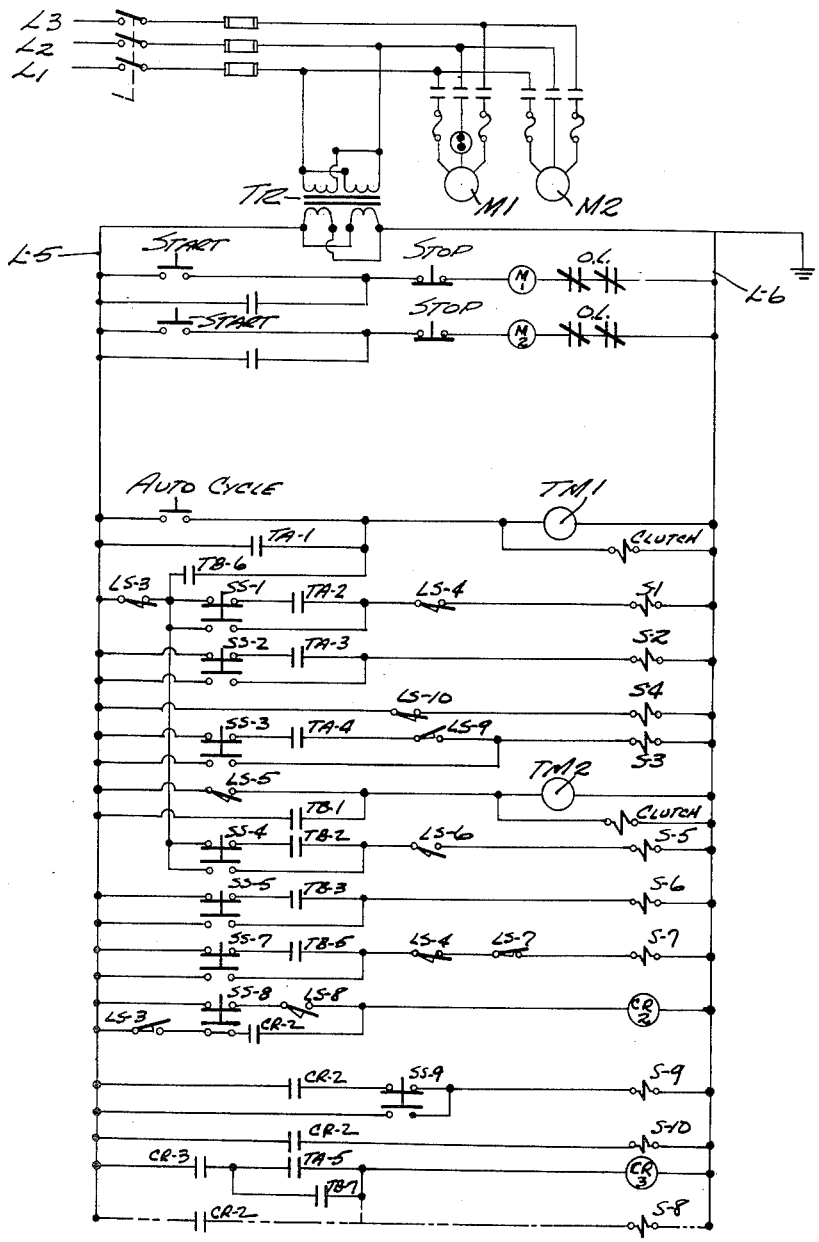
INVENTOR
Leonard D. Soubier
BY
Mead, Browne, Schuyler & Beveridge
ATTORNEYS

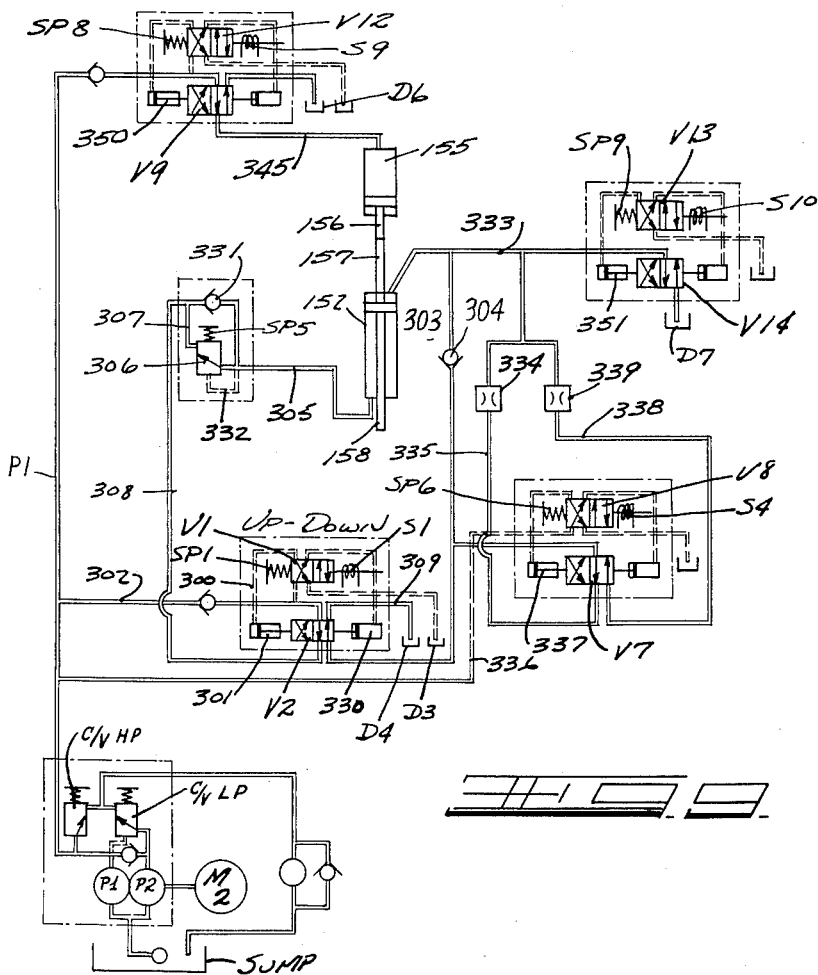

United States Patent Office 3,019,480
Patented Feb. 6, 1962

3,019,480
METHOD OF AND APPARATUS FOR MAKING PLASTIC ARTICLES
Leonard D. Soubier, Toledo, Ohio, assignor to Owens-Illinois Glass Company, a corporation of Ohio
Filed Mar. 17, 1959, Ser. No. 799,909
5 Claims. (Cl. 18—5)

The present invention relates to a method of and apparatus for making plastic articles by a combined injection, extrusion and blowing process, and more particularly to the formation of a blank from which the major portion of a plastic container or the like is subsequently blown.

In the manufacture of plastic containers or the like articles, it has been proposed that a process be utilized which includes the steps of injection molding a finished article portion, such as the neck of a container, extruding a tubular portion to form a blank, and finally blowing the formed tubular blank to final configuration. In the blowing of any articles, such as glassware, containers or the like, it is axiomatic that "the final article is only as good as the blank from which it is blown." Thus it is vital that the blank be shaped and formed to insure the best possible material distribution in the final article, to provide sufficient material for final article strength without wasting material, and to accommodate rapid and efficient blowing to final size and configuration.

The present invention is concerned primarily with a means and a method for the formation of a blank satisfying the exacting, but eminently practical, requirements set forth above, while at the same time being economically feasible from an operational standpoint, i.e., capable of being carried out within a limited period of time constituting only a fraction of the complete forming cycle. The broadest aspect of the present invention resides in the provision of a blank "tailored" to the size and configuration of the article to be formed.

In a finished container having a blown body portion of larger dimensions than the neck mold thereof, the greatest amount of material should be incorporated at the upper end portion of the body, i.e., at the shoulder or neck-to-body transition portions of the body, particularly since these portions are displaced substantially radially of the container axis during blowing, thus materially reducing the final wall thickness thereof. The problem is particularly acute at the corner portions of a square or rectangular body portion. The medial portions of the blank form the side walls of the container and these portions may be of somewhat reduced thickness. The bottom portions are normally formed by pinching the blank shut and better radial distribution is obtained at the bottom.

Since the extruded blank is generally tubular in configuration with the extrusion taking place through a fixed, generally annular orifice under substantially constant extrusion pressures exerted at a location remote from the orifice, with the upper end of the extruded tube being formed integrally with the injection molded neck, the thickness of the tubing extruded through the orifice is primarily a function of the speed of movement of the injection molded neck away from the orifice. Generally, the more slowly the neck mold is moved away from the orifice, the thicker will be the walls of the extruded tubing. Conversely, if the neck mold is moved away from the orifice at a speed greater than the normal rate of extrusion effective to form a tube of nominal wall thickness, the wall thickness will be reduced and a thinner walled tube portion will be expressed through the orifice.

This effect is utilized in the instant invention to control the wall thickness of the tube from which the final container body or the like is to be blown. Initially, the extrusion of the tube takes place as the neck mold is retracted or moved away from the extrusion orifice at a rate of speed which is relatively low, so that a relatively thick length of tubing is initially formed. After the initially thick length of tubing has been formed of an axial extent sufficient to provide the upper or shoulder portions of the finished container, the speed of tube expression through the orifice is increased so that a thinner section of tubing is extruded to provide a portion corresponding, in the finished container, to the side walls and bottom of the container.

It is, therefore, an important object of the present invention to provide a method of and apparatus for forming a tubular blank of predetermined shape from which a plastic article is subsequently blown.

Another important object of the present invention is the provision of a method of forming a hollow plastic article from an extruded tube of variant wall thickness from which a hollow plastic article is subsequently blown.

A further important object of this invention is the provision of an apparatus for withdrawing an injection mold from an annular orifice at different rates of speed along the direction of travel thereof to form a tubular extension of variant wall thickness.

Yet another object is the provision of a method of making a blown plastic article by the injection molding of a finished portion of the article, the subsequent movement of the injection mold from an annular orifice at different rates of speed to vary the wall thickness of a tube formed integrally with the material filling the injection mold, and blowing the tube to its final configuration.

Other objects and advantages of the invention will appear from the following detailed description taken in conjunction with the annexed drawings, in which:

On the drawings:

FIGURE 7 is a view similar to FIGURES 2 and 3 illustrating the apparatus in another adjusted position;

FIGURE 8 is an electrical wiring diagram schematically illustrating the electrical control system of the machine; and FIGURE 9 is a fragmentary hydraulic diagram schematically showing the hydraulic control system of the machine.

*General operation*

Figure 1:
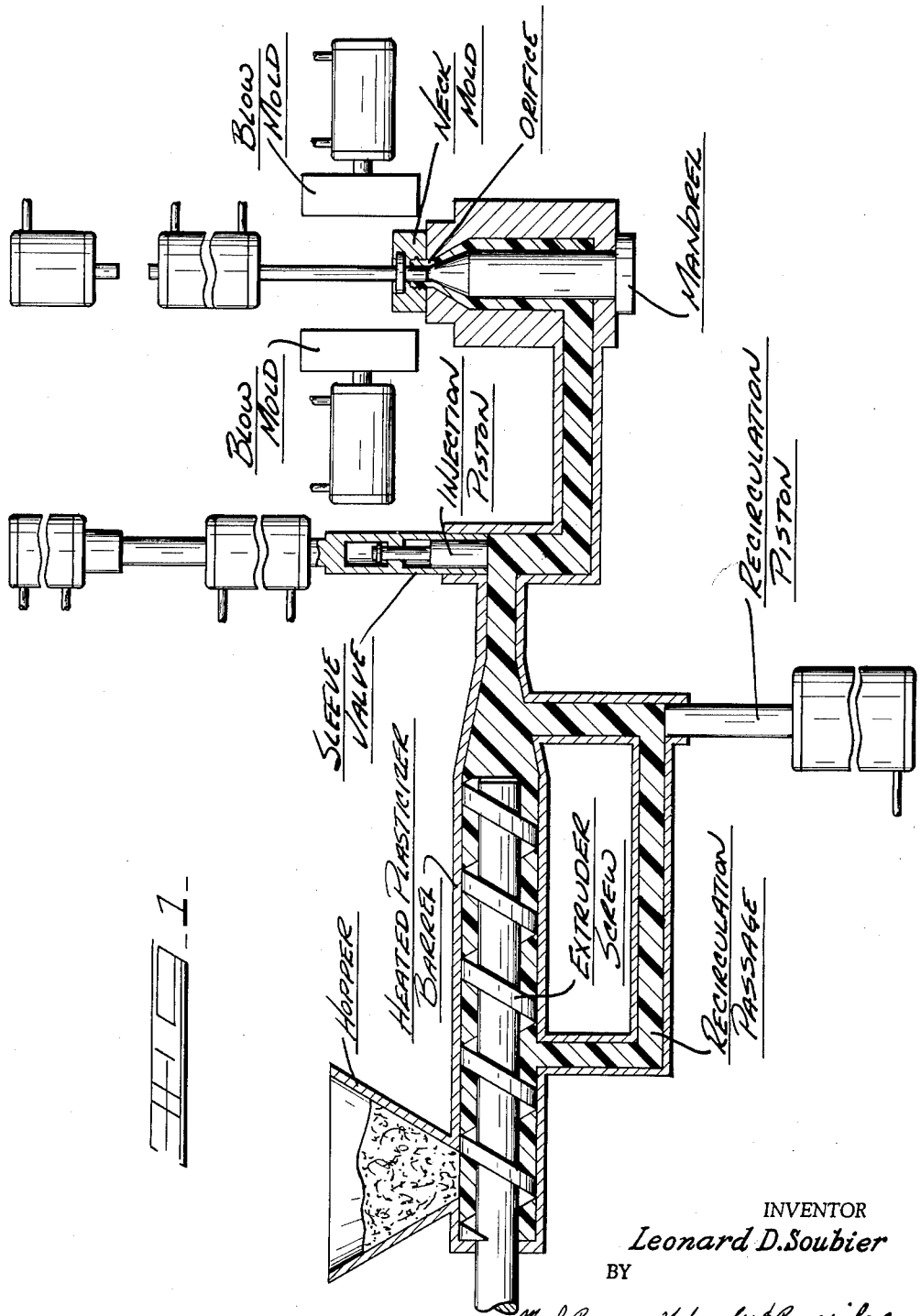
FIGURE 1 is a schematic view of a machine of the present invention.

FIGURE 1 of the drawings is a schematic overall view of the apparatus of the present invention and well illustrates the method of the present invention.

It will be noted that the machine includes generally a recirculating extruder-plasticizer, including a displaceable recirculation piston, a two-part sleeve valve and internal injection piston assembly, means defining an orifice through which the plasticized material is expressed, a neck mold within which a finished portion of an article, such as the neck of a container, is formed, and separable blow molds within which the article is blown to its final form.

The apparatus of the present invention and the method of this invention have been developed primarily for the utilization of plasticizable materials, preferably polyethylene or other similar thermoplastic materials.

Generally, the apparatus includes a hopper within which granular polyethylene or similar material is stored and communicating at its lower end with an elongated chamber or barrel of the extruder-plasticizer. Disposed within the plasticizer barrel is an extruder screw which rotates continuously to advance material to the discharge outlet. As the material is advanced by the extruder screw within the plasticizer barrel, the material is worked under pressure and is subjected to heat to render the material plastic and in fluid form as it issues from the free end of the extruder tube. The free end of the extruder barrel communicates with a recirculation passage which establishes communication from the discharge end of the extruder screw to a portion of the barrel displaced longitudinally from the hopper and located at a point at which the material within the extruder barrel is reduced to a viscous, fluid state. Recirculation of material through the recirculation passage is controlled by a recirculation piston which is single acting and which is fluid pressure actuated to supplement the extruder output during certain portions of the cycle and which also serve to control recirculation of the thermoplastic material.

The primary purpose of recirculation is to accommodate continuous operation of the extruder screw and to accommodate continuous plasticizing action without the necessity of halting and initiating extruder operations with each molding and blowing cycle. In effect, the recirculation passage forms a reserve or overflow accumulator into which the output of the extruder screw flows when the extruder output is not being utilized, this accumulator being vented back to the plasticizer.

The extruder and plasticizer output communicates with a restricted annular orifice through an elongated passage. Overlying this orifice and in communication therewith is a neck mold formed of separable neck mold halves. The neck or finish of the container is normally the most critical portion of the container, so far as dimensions are concerned, and in order to maintain these dimensions within the rather close tolerances required, the finish is preferably injection molded. The neck mold thus becomes an injection mold. Injection molding usually requires pressures different from those normally provided by a combination extruder and plasticizer, and this different pressure is utilized only during the injection molding step of the cycle. For such intermittent injection operations, the apparatus of the present invention utilizes an injection piston which is fluid-pressure displaceable into the conduit filled with plasticized material intermediate the plasticizer output and the orifice.

For the injection operation to be effective, the back flow of plastic to the plasticizer must be prevented and a column of plasticized material must be isolated between the injection system and the neck mold. This isolation is carried out by a sleeve valve concentric with the injection piston and insertable into the plasticized material conduit. Further, this sleeve valve is closed at all times at which plastic material is not being expressed through the orifice from the extruder-plasticizer. A novel actuating means for sequentially actuating the sleeve valve and the injection piston and also for operating the sleeve valve independently of the piston is provided by the present invention.

Following the injection of the finish within the separable neck mold, extrusion of plasticized material from the extruder-plasticizer through the orifice occurs during elevation of the neck mold, so that an extruded tubular extension is formed integral with the material filling the neck mold. The vertical movement of the neck mold is carried out in timed, correlated sequence to the extrusion of the extension, so that the extension is of differential wall thickness throughout its length to provide additional material at those portions of the finished container which need such additional material.

Following the extrusion of the tubular extension and movement of the neck mold from its position overlying the orifice, the tubular extension is enclosed within a pair of separable blow molds and blow air or other pressured fluid is introduced through the neck mold to blow the container to its final configuration.

Finally, a container-severing and container-pickup apparatus is actuated to remove the finished article from the machine after the opening of the blow molds.

The complete apparatus is disclosed in the copending application of Richard C. Allen and Leon E. Elphee, Serial No. 797,276, filed in the United States Patent Office on March 4, 1959, and assigned to the assignee of the present invention. The instant application is concerned primarily with the vertical movement of the neck mold and the control thereof.

*Neck mold and actuating structure*

The flow of plasticized material from the plasticizer outlet is distributed to a plurality of orifices 101 in an orifice block 80 through cross channel 129 (FIGURE 2) and individual passages 128. From each of the lateral passages 128, the plastic material passes through an annular flow passage between a mandrel 95, an orifice sleeve 91 and an orifice nozzle 103 for issuance through the orifice 101.

Figure 2:
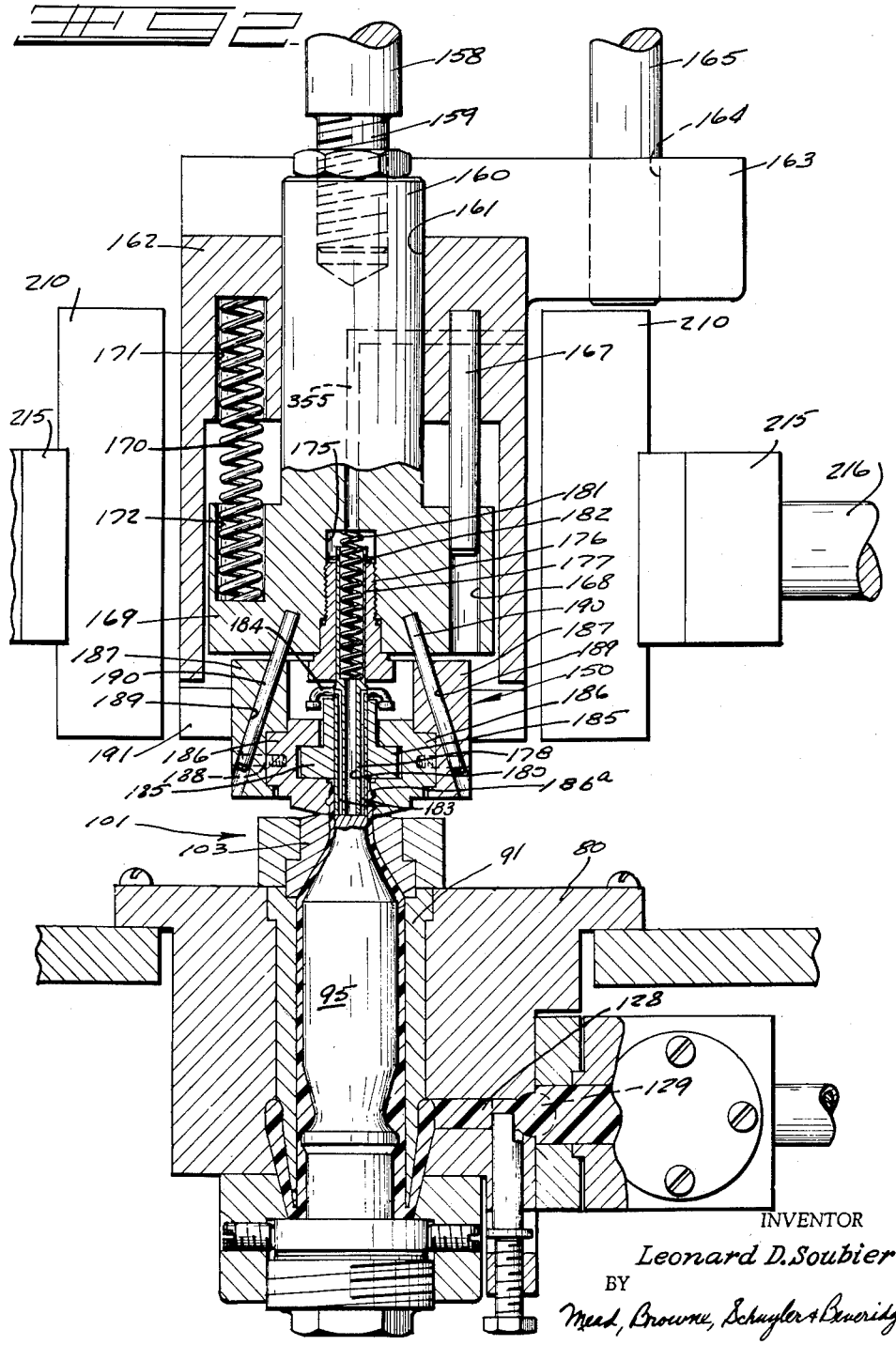
FIGURE 2 is a vertical fragmentary sectional view taken through an extrusion orifice of the machine.
Figure 3:
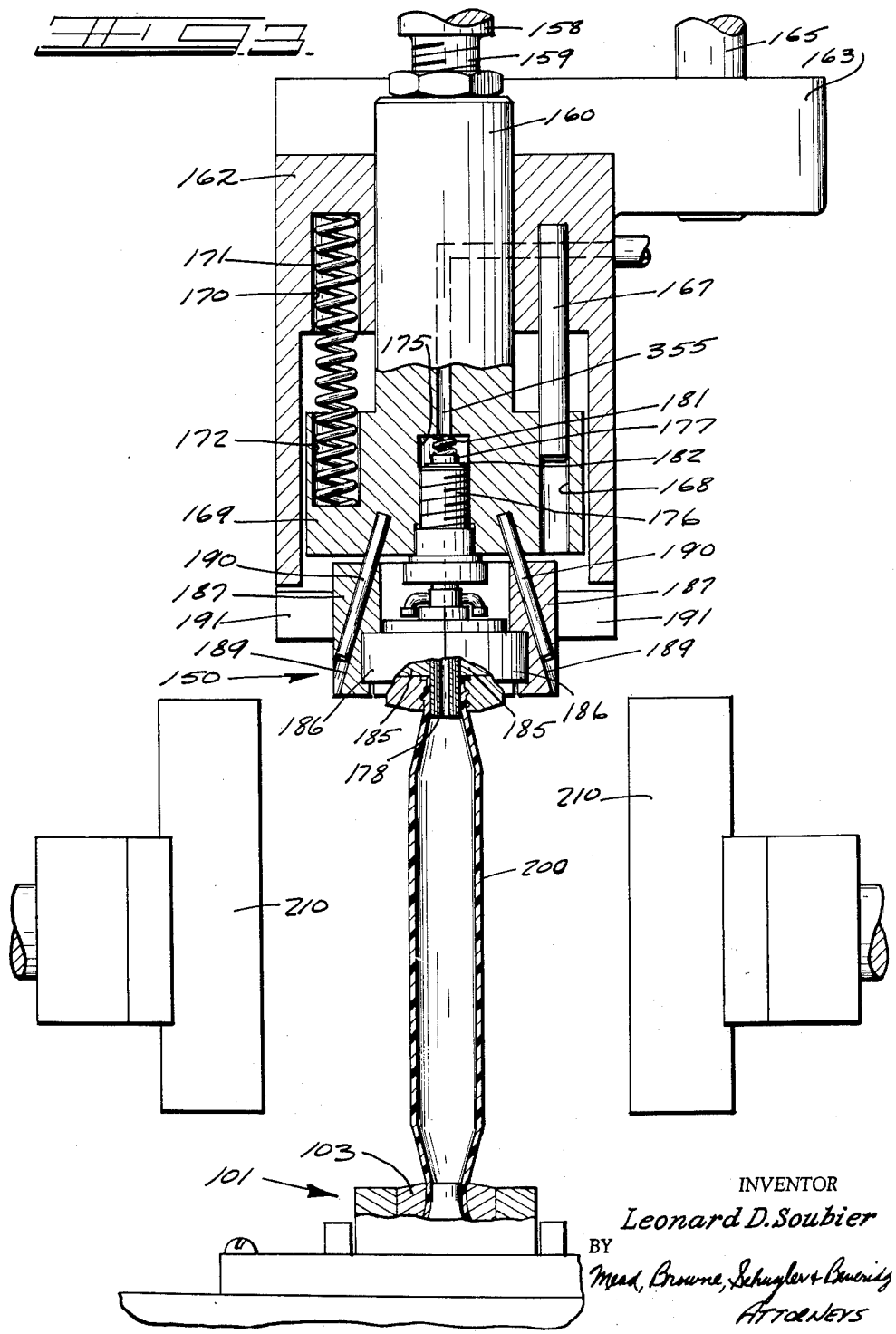
FIGURE 3 is a view similar to FIGURE 2 illustrating a portion of the machine in an operated position.

As best illustrated in FIGURES 2, 3 and 7, each of the orifices 101 is defined by a cooperating mandrel 95 and a nozzle 103, and each such orifice is adapted for the discharge of plastic material upwardly therethrough. During the injection of the neck or finish of a container or the like, the orifice 100 has superimposed thereon a neck mold indicated generally at 150.

Figure 4:
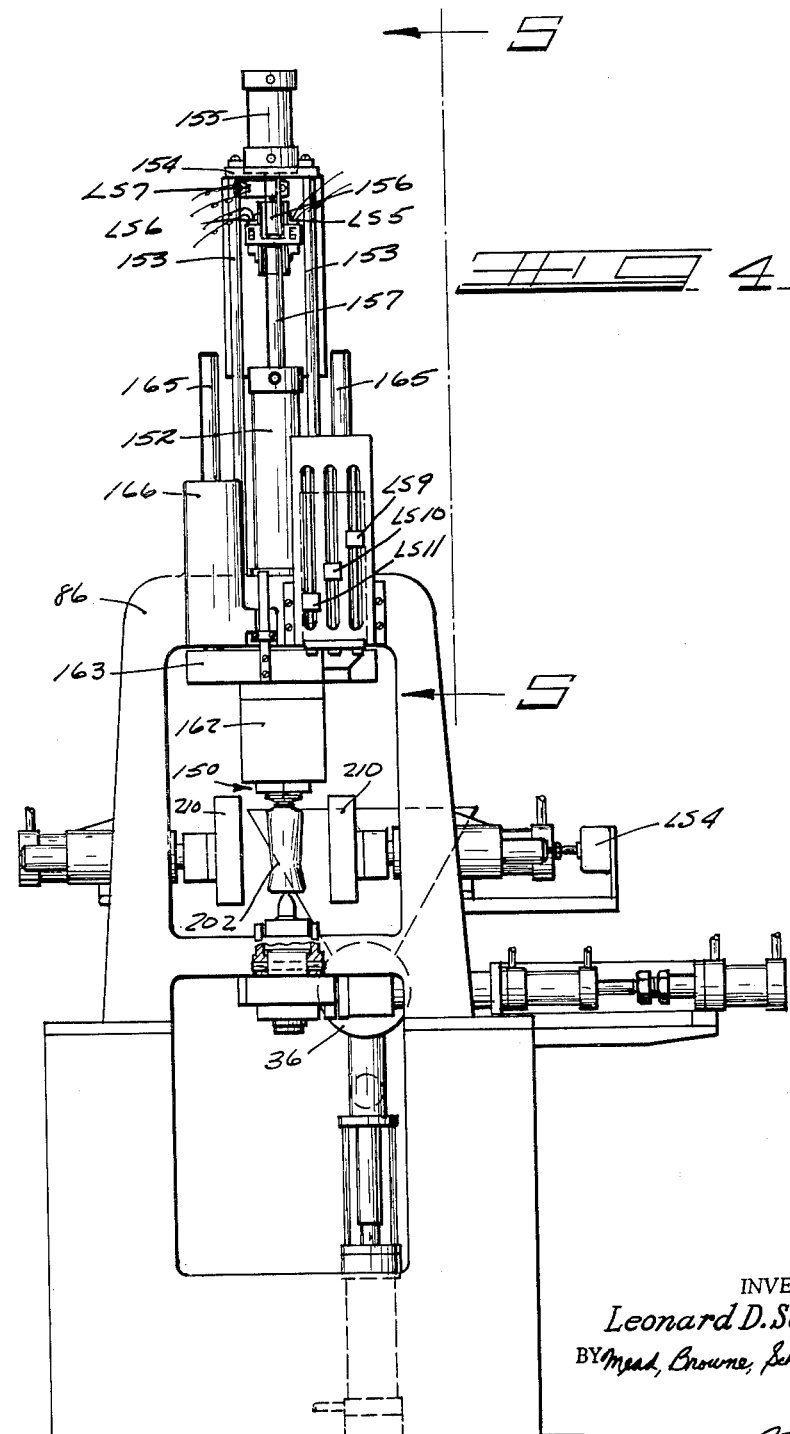
FIGURE 4 is an end view, with parts broken away, and in section of the machine.

This neck mold is carried by the machine base 85 through upper side frames 86 (FIGURES 4 and 5), the side frames being joined by an upper support plate 151 upon which is mounted a vertically disposed neck mold actuating cylinder 152. This neck mold cylinder 152 is surrounded by an upwardly extending frame 153 carrying a top support plate 154 on which is superimposed a stop or check cylinder 155. As will be explained in connection with the control system and operation of the device of the present invention, the stop cylinder 155 is adapted to receive fluid under pressure through line 345, the cylinder 155 being single acting and being urged downwardly by fluid pressure, so that the actuating rod 156 thereof abuts the upper extremity of the upper extension 157 of the actuating rod 158 of the cylinder 152. The cylinder 152 which controls normal movement of the neck mold 150 is double acting and is actuated by fluid pressure introduced thereinto through lines 305 and 333. The lower end 158 of the piston rod of cylinder 152 is threadedly connected, as at 159, with a neck mold guide block 160 guided by a vertical bore 161 formed in a fixed guided yoke 162 provided with oppositely laterally directed pilot portions 163 each having a vertical aperture 164 receiving a vertically disposed fixed guide rod 165. The guide rods 165 are secured in the apertures 164 and project vertically through upstanding fixed guide bosses 166 secured to the frame 86 (FIGURE 4). The guide yoke 162 is thus supported for vertical reciprocating movement from its lowered position (illustrated in FIGURE 2 of the drawings) to its raised position (illustrated in FIGURE 3 of the drawings). The guide yoke 162 is actuated between these two positions by means of the actuating cylinder 152.

The guide yoke 162 carries a plurality of depending guide pins 167 fixed to the yoke and depending into vertical apertures 168 formed in a radially enlarged embossment 169 formed at the lower end of the block 160. The block 160 is urged to its illustrated lowered position relative to the guide yoke 162 by a plurality of compression springs 170 interposed therebetween and having their ends inserted into opposing, aligned recesses 171, 172.

The lower extremity of the block 160 is provided with an upwardly extending recess 175 into which is threaded a sleeve 176 which is centrally bored to receive the upper tubular end 177 of a vertically movable neck mold mandrel 178. This neck mold mandrel is provided with a central axial bore 180 through which blow air or other suitable fluid under pressure can be introduced by means of a radial air passage 355. The fluid pressure supply system is illustrated in FIGURE 9 and is hereinafter described in greater detail. The bore 180 of the neck mold mandrel 178 is radially enlarged at its upper end to accommodate a compression spring 181, and this spring 181 normally urges the neck mold mandrel downwardly to engage a radial enlargement 182 within the chamber 175 against the end of the threaded sleeve insert 176.

In addition to the axial bore 180, the neck mold mandrel 178 is provided with a plurality of vertical passages 183 parallel to the bore 180 and communicating at their upper ends with outlet housings 184, as best shown in FIGURE 2.

The spring pressed neck mold mandrel 178 is enclosed within a separable neck mold housing comprising two separable angle blocks 185 surrounding the neck mold mandrel 178 and two semi-cylindrical half-molds 186 cooperatively contoured, as at 186A, to define the bottle finish. In the illustrated embodiment, these surfaces 186A are contoured to cooperatively define exterior threads, although other neck finishes may be provided if such is desired. The neck molds 186 are mounted upon and co-movable with carriers 187, co-movement of the mold halves 186 and the carriers 187 being insured by cap screws 188. The separable carriers 187 are provided with inclined recesses 189 within which are slidably disposed similarly inclined guide pins 190 carried by the enlarged embossment 169 of the element 160. The carriers 187 are interposed between side guide projections 191 formed on the guide yoke 162 and slots 187A receive projections and thus prevent vertical movement of the carriers 187 and the molds 186 relative to the guide yoke, but accommodates relative lateral separatory movement of the mold halves 186 and the carriers 187.

Figure 5:
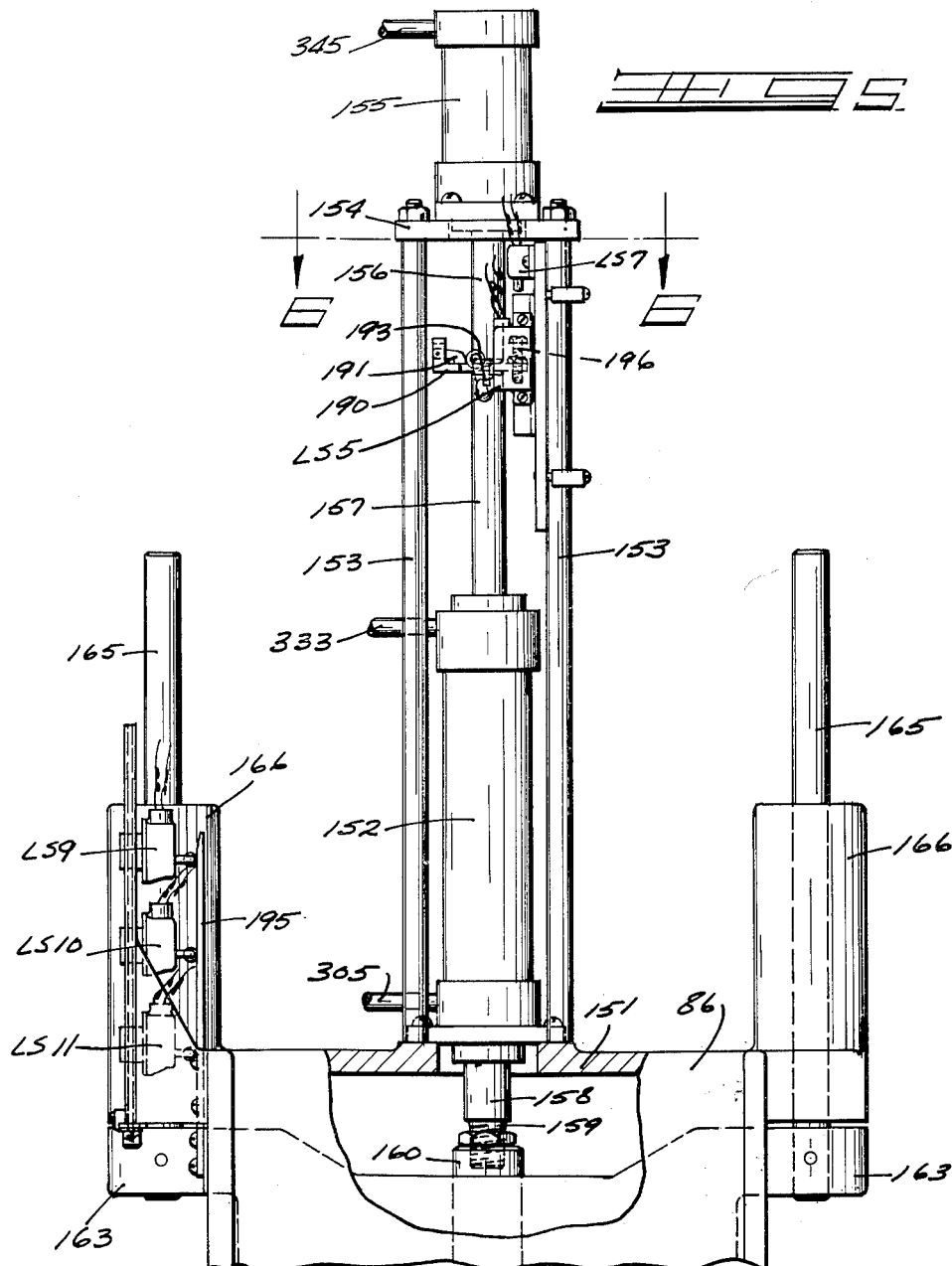
FIGURE 5 is an enlarged sectional view taken on the plane 5—5 of FIGURE 4.

The operation of the neck mold of the present invention will be readily appreciated by comparison of FIGURES 2, 3 and 7, from which it will be seen that the neck mold is originally lowered to its position of FIGURE 2 with the neck mold mandrel 178 contacting the free upper end of the orifice mandrel 95 and with the threaded neck recess defined by the cylindrical outer surface of the neck mandrel 178 and the threaded contour of the interior of the mold halves 186 registering with the orifice 100. With the neck mold positioned in this manner, the cylinder 65 is actuated to subject the plastic material to injection pressure, and plastic material will be injected into the finish mold, confined therein, and injection molded to its finished configuration. Next, the cylinder 152 is actuated to retract the piston rod 158 upwardly, elevating the guide yoke 162, the block 160 and the neck mold 150 as a unit to the position of FIGURE 3. During this movement of the neck mold, the recirculation cylinder 47 is actuated and plastic material is extruded through the orifice 100 to form the tubular extension, as best illustrated in FIGURE 3. During this movement, the speed of withdrawal of the neck mold 186 is governed by a series of limit switches arranged vertically in sequence and supported by one of the cylindrical guide post bushings 166, as illustrated in FIGURES 4 and 5. The actuation of these limit switches is carried out by an actuating arm 195 carried by the adjacent guide projection 163. The specific operation of these limit switches is illustrated in FIGURES 8 and 9 and described in detail in connection therewith.

The extruded plastic tubular extension 200 may thus be of varying wall thickness, the wall thickness varying inversely with the speed of retraction of the piston-actuating rod 158.

When the neck mold 150 has been retracted to its position of FIGURE 7, the piston rod 157 at the upper end of the cylinder 152 abuts the piston rod 156 (FIGURE 4) of the stop cylinder 155. Upon release of the stop cylinder, by means described in connection with FIGURES 8 and 9, further retraction of the piston rod 158 is accommodated with consequent movement of the neck mold from its position of FIGURE 3 to its position of FIGURE 7. Such additional movement of the piston rod will open the neck mold because of abutment between the plate 151 and the stops 156 carried thereby and the extensions 163 of the element 160. Consequently, the guide block 162 will be held in its position of FIGURE 3, while the element 160 will be retracted against the force of the compression springs 170. This retraction will cam the mold carrier blocks 187 laterally outwardly because of the inclination of the guide pins 190, and the mold halves 186 will be separated laterally from the finish 201 previously molded by injection. As a consequence of relative movement of the guide block 162 and the element 160, the neck mold mandrel 178 is retracted from the finish 201 and the neck molds 186 are retracted laterally as above described, so that the bottle neck or finish is completely released and the bottle is no longer carried by the neck mold.

Figure 6:
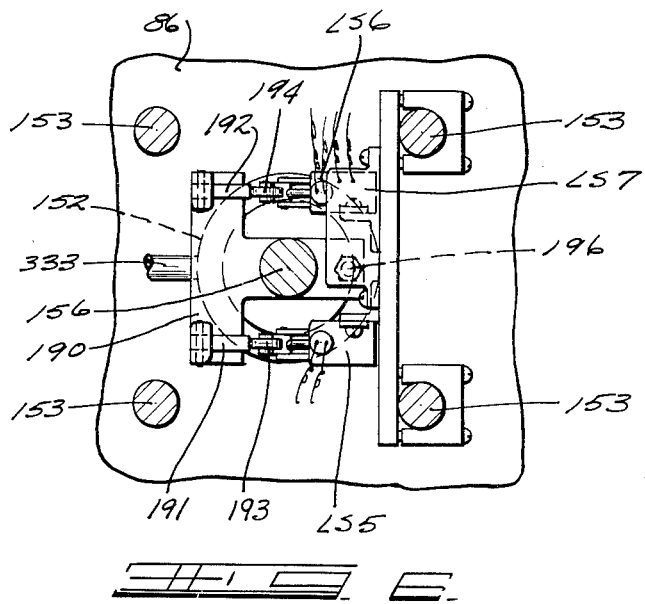
FIGURE 6 is a view taken along the plane 6—6 of FIGURE 5.

Surmounting the free upper end of the actuating rod 157 of the neck mold cylinder 152 is a T-shaped plate 190 (FIGURES 5 and 6) movable vertically with the neck mold 150. On this plate is a pivoted finger 191 engageable with the actuating arm 193 of a limit switch LS5 when the neck mold is in its position of FIGURE 3. The switch LS5 functions as hereinafter more fully described and the utilization of the pivoted finger accommodates actuation of the switch only on the upper stroke of the cylinder 152.

Also carried by the plate 190 is a second projection 192 (FIGURE 6) engageable with the actuating arm 194 of a limit switch LS6 when the neck mold is in its position of FIGURE 3. This switch LS6 is a safety interlock to prevent timer actuation of the blow mold cylinders 220 unless the neck mold is withdrawn upwardly, as hereinafter described in detail.

The plate 190 is provided with a vertical projection 196 for actuating an upper limit switch LS7 when the neck mold is in its position of FIGURE 7. This switch LS7 actuates the take-out return as hereinafter described.

Intermediate the operational steps illustrated in FIGURES 2, 5 and 7 of the drawings, a pair of complementary blow mold sections 210 are closed upon the tubular extension 200 and air is introduced through the air passage 355, the chamber 175, the axial passage 180 of the neck mandrel 178 and into the interior of the tubular extension 200. This blowing is effective to form the finished container 202 by the blowing of the tubular extension 200 against the complementary blow mold sections. The introduction of fresh air is accommodated by the escape of a portion of the blow air through the passages 183.

*Electric and hydraulic control system*

FIGURES 8 and 9 of the drawings illustrate schematically the electric and hydraulic control circuits.

As best illustrated in FIGURE 8 of the drawings, two electric motors are preferably utilized, motor M1 driving the extruder screw and motor M2 driving a pair of hydraulic pumps P1 and P2 as best shown in FIGURE 9. These motors M1 and M2 receive three phase, sixty cycle, 220 volt electric power from lines L1, L2 and L3 and this power is converted to 110 volt current through a transformer TR to supply said current to a control system through main lines L5 and L6. The motors M1 and M2 are provided with conventional control circuits including one-way start and stop switches, the start switches being bridged by conventional holding circuits.

The control circuit incorporates two separate and distinct timers driven through timer motor TM1 and TM2. The initial phases of operation are under the control of timer motor TM1 provided with an autocycle switch. This autocycle switch is bridged by a timer contact closed by the motor TM1, namely contact TA1, which cooperates with a contact TB6 closed by the timer motor TM2 to provide overlapping of the two timer phases upon recycling of the machine, as will be later explained.

To condition the machine for operation, it is essential that the neck mold 150 be in its down or lowered position, contacting the upper surface of the orifice block 103, so that the interior neck mold recesses 187 are aligned with the orifice 101. As best shown in FIGURE 9, the positioning of the neck mold 150 in its down position is attained by actuating the primary neck mold piston 152 downwardly within its cylinder. This operation requires energization of the solenoid S1 to actuate fourway valve V1 to the left against the bias of spring SP1 so as to interconnect the main hydraulic pressure line P1 with the upper end of the cylinder 152 for the neck mold 150. Actuation of the valve V1 to the left will effect fluid flow through fluid flow line 300, actuating to the right positioning cylinder 301 and displacing fluid flow control valve V2 to the right. In this manner, hydraulic line 302 receives fluid under line pressure from the main pressure line P1, this flow being passed through valve V2 through line 303 and check valve 304 to the upper end of the neck mold cylinder 152. Fluid displaced from the lower side of the neck mold piston by downward movement of the piston will be displaced through line 305, flow control valve 306 and lines 307 and 308 to a sump or drain line 309 through the valve V2.

Returning now to FIGURE 8, it will be seen that the solenoid S1 for depressing the neck mold 150 as heretofore described will be actuated when limit switch LS3 is actuated by retraction of the take-out 230, timer contacts TA2 have been actuated by the timer motor TM1, and limit switch LS4 responsive to full opening of the blow molds 210 has been closed.

After lowering of the neck mold 150 to its position immediately overlying the orifice, the next operation involves the injection of the container finish by the displacement of plastic material under pressure into the neck mold 150. As illustrated in FIGURE 8, this operation is carried out merely upon closure of primary contacts TA3 driven by the timer motor TM1 to energize solenoid S2.

Simultaneously with the opening of the timer contact TA3 and the de-energization of the solenoid S2, timer contact TA4 is closed which, so long as limit switch LS9 is closed by the presence of the neck mold 150 in its down position, energizes the solenoid S3. This solenoid S3 is effective to terminate the injection molding operation and initiate the extrusion of the tube 200, as shown in FIGURE 3.

To accommodate the flow of material from the extruder screw and the recirculation piston the neck mold 152 must be displaced upwardly.

To accommodate upward movement of the neck mold, as the extrusion of the tubular extension proceeds, the timer switch TA2 is de-energized, de-energizing the solenoid S1 and allowing the valve V1 to return to its illustrated right-hand position of FIGURE 9. At this time, the spring SP1 returns the valve V1 to its right-hand position interconnecting the actuating cylinder 301 with a drain conduit D3 and connecting a second actuating cylinder 330 with the pressure conduit 302. Displacement of the valve V2 to the left results in the connection of the line 308 with the hydraulic fluid under pressure in the line 302. Pressure within the line 308 opens the check valve 331 against the bias of its spring, thus bypassing the valve 306 and simultaneously exerting pressure on the under side of the neck mold lift cylinder 152 and on the valve 306 through by-pass line 332 to elevate the valve 306 so as to accommodate the interconnection of the pressure line 308 and the line 305. Thus, fluid pressure exists on the under side of the neck mold piston 158 urging the piston upwardly, which pressure flows through valve 306 more easily than through check valve 331. Once pressure exists on both sides of the valve 331, the check spring closes the valve.

Upward movement of the piston is resisted by back pressure generated thereabove in the cylinder 152, this back pressure being generated by the flow of fluid through line 333 and a restricted orifice 303 vented to a drain D4 through valve V2 and line 309 previously described.

Thus, the neck mold 150 will be displaced upwardly slowly during its initial movement due to the resistance to back pressure flow through the restricted orifice 334. This slow initial movement of the neck mold 150 is desirable to (1) provide a thicker wall section in that portion of the tubular extension 200 corresponding to the shoulders of the finished container and to (2) avoid the rupture of the material issuing from the orifice 100 under the combined pressures exerted by the extruder screw 52 and the recirculation piston 46 from the material previously injection molded in the neck mold 150.

As the neck mold 150 moves upwardly, the plate 195 attached thereto contacts limit switch LS10, closing this limit switch and energizing solenoid S4. This solenoid S4 is effective to displace to the left valve V8 against the bias of spring SP6. Leftward movement of the valve V8 will interconnect pressure line 336 and an actuating cylinder 337 displacing the valve V7 to the right. Displacement of the valve V7 to the right will interconnect line 303 and the drain D4 with a line 338 so as to accommodate flow through a second and larger orifice 339. The interposing of the larger orifice 339 into the drain line of the neck mold cylinder 152 will offer less resistance to displacement of the neck mold cylinder upwardly and will result in upward travel of the neck mold 150 at an increased rate of speed. Thus, the wall thickness of the tubular extension will be lessened.

As the neck mold 150 continues to move upwardly, the projecting plate 195 on the neck mold actuating rod 158 closes limit switch LS5, and this limit switch will initiate operation of the second timer by starting timer motor TM2.

It will be noted that the solenoid S4 controlling actuation of the neck mold piston 158 by venting the back pressure effective thereon to drain is energized by the limit switch LS10 and not by a contact of the first timer TM1. Therefore, the neck mold 150 continues to travel upwardly.

Upon opening of the timer contacts TA4, the solenoid S3 is de-energized to cut off the flow of material to the orifice 101 by means of the sleeve valve.

The neck mold 150 continues to move upwardly, stretching slightly the previously extruded plastic material tubular extension 200 and such stretching continues until the upper stop extension 157 of the neck mold piston contacts the stop rod 156 of the stop cylinder 155. The stretching of the tubular extension 200 results in the formation of a uniform, truly vertical tube which is aligned with the vertical axis of the mold and which can be blown to a uniform container. The stretching does not change any differential wall thickness in the tube, since substantially uniform longitudinal thinning of all wall thicknesses results. This stop rod 156 is extended downwardly inasmuch as pressure in the main line P1 is passed by valve V9 through line 345 to the upper end of the cylinder, as shown in FIGURE 20. Because of the pressure drop across the restricted orifice 339, the pressure acting in the under side of the neck mold piston is less than the pressure acting upon the upper side of the stop cylinder, and the cylinder neck mold piston will no longer be displaced upwardly despite the fact that there is full line pressure on the under side thereof.

As soon as the neck mold clears the upper extent or extremity of the blow molds, limit switch LS6 is actuated to close the blow molds 210 by solenoid S5.

This solenoid S5 remains actuated while a solenoid S6 is energized by timer contact TB3 to introduce expanding air through the hollow neck mold mandrel to expand the tubular extrusion against the inner wall surfaces of the blow molds. The blowing operation is a timed operation and the opening of the contact TB3 will shut off the expanding air by de-energizing solenoid S6.

The blow air introduced through the neck mold 180 is under substantial pressure, i.e., on the order of 100 pounds per sq. in., and substantially instantaneous inflation of the tube 200 will occur. To promote cooling of the tube, circulation of this blow air is accommodated through passages 183 and valve housings 184.

Subsequently and after the elapse of sufficient time to accommodate setting of the heated material the opening of the timer contacts TB2 will de-energize the solenoid S5, to open the blow molds. Opening of the blow molds actuates limit switch LS4 to its closed position. The limit switch LS7 was previously closed when the neck ring was moved to its uppermost position. Upon closure of the timer contact TB5, solenoid S7 is energized and the take-out is actuated to move the take-out inwardly beneath the blown containers which are exposed when the molds open (FIGURE 7).

When the take-out is in its furthest position, limit switch LS8 is actuated to energize relay CR2 and the energization of this relay will energize solenoids S8 and S9 and S10. Solenoid S8 is effective to introduce inflating air into the resilient bags of the take-out thereby clamping the finished containers in the take-out. At the same time, solenoid S9 is energized to actuate valve V12 to the left against the bias of a spring SP8 moving actuating cylinder 350 to the right and similarly moving valve V9. Valve V9 in its actuated right hand position interconnects the line 345 and a drain D6, thus removing the hold-down pressure on the neck mold hold-down cylinder. This frees the neck mold for further upward movement under the pressure in line 305.

To facilitate the rapid upward movement of the neck mold, solenoid S10 is energized to displace valve V13 to the left against the bias of spring SU9, so that actuating cylinder 351 can displace valve V14 to the right interconnecting the back pressure line 333 with a drain D7. The valve V14 accommodates substantially full flow from the line 333 to the drain D7, thereby accommodating the relatively rapid upward movement of the neck mold and releasing the container finish from the neck mold.

The opening of the molds to open LS4 de-energizes the solenoid S7 to thereby retract the take-out. It will be noted that the energization of the relay CR2 to energize the solenoid S8 also energizes relay CR3, and energization of the relay CR3 will introduce a timed operation, under timer contacts TB7 for maintaining the solenoid S8 energized to maintain clamping pressure upon the containers in the take-out after the take-out has returned to its normal position. When the timed operation of the relay CR3 expires, the containers are released from the take-out and are removed by gravity or any other suitable way from the apparatus.

Additionally it will be seen that actuation of the relay CR3, through its points establishes a circuit through timer contacts TB7 and TA5, thus bridging the gap between timers TM1 and TM2 and re-establishing timer TM1 as the controlling timer, so that the next cycle may commence by energization of the solenoid S1 and movement of the neck mold downwardly as heretofore described.

I claim:

1. In a method of making a container of thermoplastic material by the injection molding of a container neck in a mold positioned over an annular orifice, the steps of initially simultaneously moving the neck mold away from the orifice and extruding a tube through said orifice, and varying the rate of neck mold movement to vary the wall thickness of the extruded tube, terminating the extrusion through the orifice and continuing the movement of the neck mold away from the orifice to stretch the extruded tube while maintaining the relative variations in the wall thickness of the extruded tube.

2. In a method of making an article of plasticized material, the steps of superimposing a mold over an extrusion orifice, injecting material into said mold, allowing said material to set in said mold, and moving the mold vertically upwardly away from said orifice while extruding through said orifice a tubular extension integral with said material in said mold, said mold being moved from said tube being unsupported intermediate the mold and the orifice, said orifice at an initial relatively slow speed to prevent rupture of the tube as it is initially formed and being moved subsequently at a relatively faster speed to extrude lower portions of the tube, the variations in mold movement speed varying inversely the wall thickness of said tubular extension.

3. In a method of making a container of thermoplastic material by the injection molding of a container neck in a mold positioned over an annular orifice, the steps of simultaneously moving the neck mold away from the orifice and extruding through said orifice a tube supported at one end by its juncture with material in the neck mold and joined at the other end to material in the orifice, initially moving the neck mold from the orifice slowly to extrude the tube to a predetermined wall thickness, and subsequently moving the neck mold from the orifice at a faster rate to extrude the tube to a wall thickness less than said predetermined wall thickness.

4. In a method of making an article of plasticized material, the steps of positioning an injection mold in communication with an orifice, supplying plasticized material to the orifice to fill the mold with said material, allowing said material to set in said mold, simultaneously supplying additional material to the orifice and moving the mold linearly from the orifice to extrude through the orifice a tube unsupported between the orifice and the mold, the mold being moved from said orifice at an initial relatively low speed and subsequently being moved at a relatively faster speed to vary the wall thickness of said tubular extension, interrupting the flow of plastic material to terminate the extrusion, and continuing to move the injection mold away from the orifice to stretch the tube between the mold and the orifice while maintaining the variations in the wall thickness of the tube.

5. An apparatus for making a blank from which a blown plastic article is to be made including means defining an extrusion orifice, an injection mold movable linearly from a first position overlying said orifice to a second position spaced from said orifice, means for filling said mold with plastic material at its first position, and means for extruding a tubular extension integral with the material filling said mold during movement, the improvement of actuating means for moving said mold from its first position to its second position, a plurality of successively operable means for regulating the speed of movement of said actuating means, and means responsive to linear displacement of said mold for operating said successively operable means to vary the speed of movement of said mold.

References Cited in the file of this patent

UNITED STATES PATENTS

| | | |
|---|---|---|
| 2,657,431 | Slaughter | Nov. 3, 1953 |
| 2,710,987 | Sherman | June 21, 1955 |
| 2,804,654 | Sherman | Sept. 3, 1957 |
| 2,919,462 | Friden | Jan. 5, 1960 |

FOREIGN PATENTS

| | | |
|---|---|---|
| 1,029,586 | France | Mar. 11, 1953 |